United States Patent
Marceca et al.

(10) Patent No.: US 6,601,567 B2
(45) Date of Patent: Aug. 5, 2003

(54) METHOD FOR THE CONTROL OF AN INJECTOR IN AN INTERNAL COMBUSTION ENGINE

(75) Inventors: Paolo Marceca, Bologna (IT); Luca Poggio, Spinetta Marengo (IT); Michele Cagnoni, Piossasco (IT); Piero Carbonaro, Turin (IT); Andrea Nepote, Turin (IT)

(73) Assignee: Magneti Marelli Powertrain S.p.A., Turin (IT)

( * ) Notice: Subject to any disclaimer, the term of this patent is extended or adjusted under 35 U.S.C. 154(b) by 76 days.

(21) Appl. No.: 09/922,511

(22) Filed: Aug. 3, 2001

(65) Prior Publication Data

US 2002/0017279 A1 Feb. 14, 2002

(30) Foreign Application Priority Data

Aug. 4, 2000 (IT) ...................................... BO2000A0488

(51) Int. Cl.[7] .............................................. F02M 51/00
(52) U.S. Cl. ........................ 123/490; 701/104; 361/152
(58) Field of Search ............................. 123/490, 198 D; 701/104, 107, 114, 115; 361/152; 73/119 A, 117.3

(56) References Cited

U.S. PATENT DOCUMENTS

| 4,092,717 A | 5/1978 | Di Nunzio ................... 364/431 |
| 4,589,401 A | 5/1986 | Karim et al. ................ 123/479 |
| 5,043,984 A | 8/1991 | Tomisawa et al. ............ 371/16 |
| 5,452,700 A | * 9/1995 | Matsuura ..................... 123/490 |

* cited by examiner

Primary Examiner—Henry C. Yuen
Assistant Examiner—Arnold Castro
(74) Attorney, Agent, or Firm—Baker & Daniels

(57) ABSTRACT

A method for control of an injector in an internal combustion engine in which for a specific engine cycle, a control unit calculates a desired value of the opening time of the injector and forwards this desired value to a drive circuit of the injector, a supervision device calculates an actual value of the opening time of the injector during the injection phase, compares this actual value with the desired value and generates an error signal if the difference between the desired value and the actual value is outside a predetermined acceptability range.

5 Claims, 4 Drawing Sheets

METHOD FOR THE CONTROL OF AN INJECTOR IN AN INTERNAL COMBUSTION ENGINE

The present invention relates to a method for the control of an injector in an internal combustion engine, and in particular for the control of an injector of a direct petrol injection system, to which the following description will make explicit reference without, however, departing from its general nature.

BACKGROUND OF THE INVENTION

Petrol engines provided with direct fuel injection, i.e. engines in which the petrol is injected directly into the cylinders by appropriate injectors, each of which is normally disposed in the port of a respective cylinder, have recently been introduced into the market.

For the correct operation of a direct petrol injection engine, the quantity of petrol injected by each injector needs to be correct, i.e. equal to a desired value calculated in real time by a control unit. In these engines, the torque generated generally depends directly on the quantity of petrol injected into the cylinders; if one or a plurality of injectors (following a breakdown or malfunction) therefore inject too much petrol into the cylinders, this may be potentially very hazardous for the driver as the vehicle tends to accelerate even when the driver is not exerting any pressure on the accelerator pedal.

SUMMARY OF THE INVENTION

The object of the present invention is to provide a method for the control of an injector in an internal combustion engine which ensures the correct injection of fuel and which is, moreover, simple and economic to embody.

The present invention therefore relates to a method for the control of an injector in an internal combustion engine as claimed in claim 1.

BRIEF DESCRIPTION OF THE DRAWINGS

The present invention will now be described with reference to the accompanying drawings, which show a non-limiting embodiment thereof, in which.

DETAILED DESCRIPTION OF THE INVENTION

Figure 1:
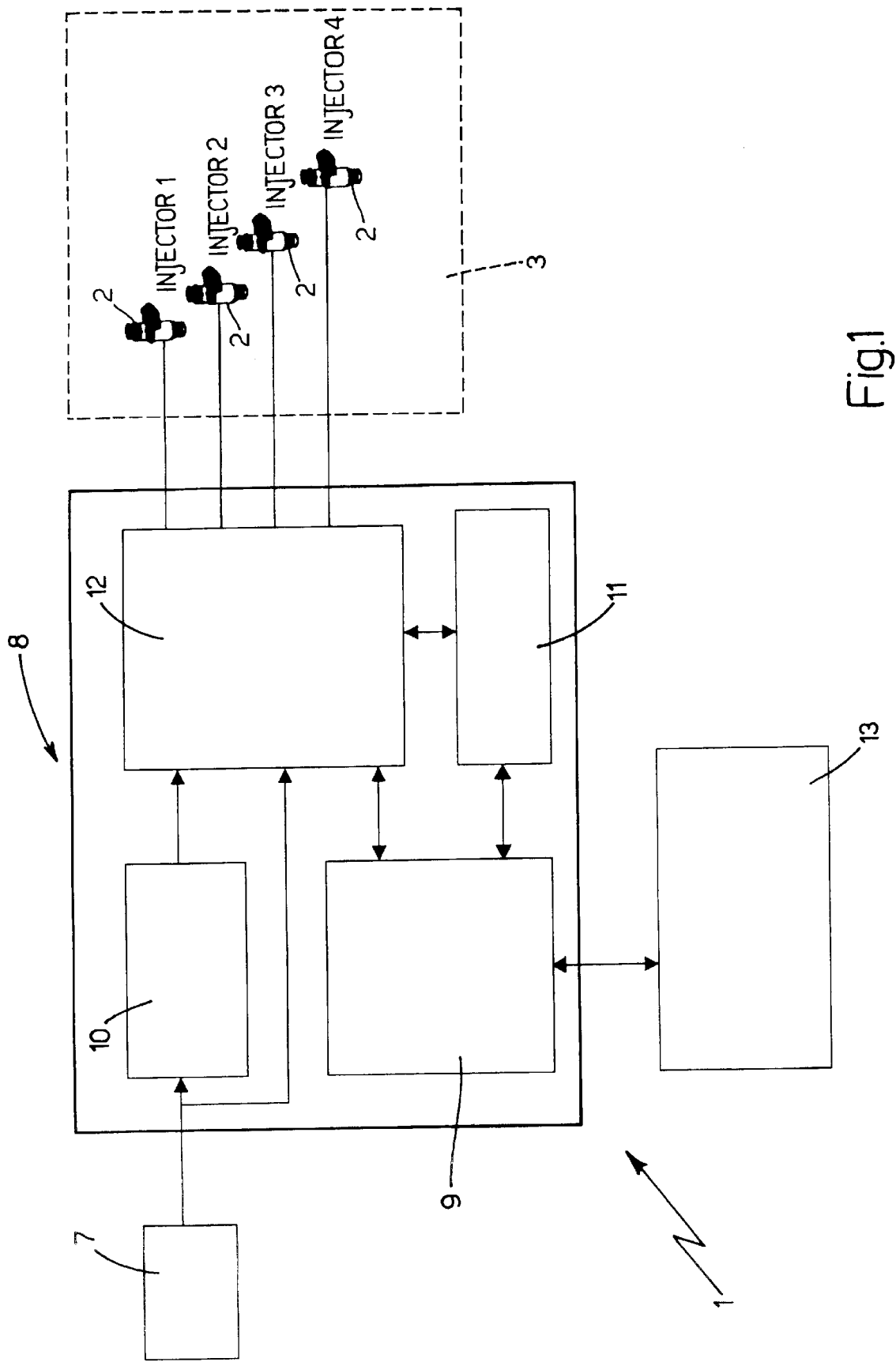
FIG. 1 is a diagrammatic view of the control device of the present invention.

In FIG. 1, a device for the control of four injectors 2 of known type (shown in FIG. 1 as INJECTOR1, INJECTOR2, INJECTOR3, INJECTOR 4) of an internal combustion engine 3 (shown diagrammatically) provided with four cylinders (not shown) disposed in line is shown overall by 1. Each injector 2 is provided at the location of the port of a respective cylinder (not shown) of the engine 3 in order directly to inject a predetermined quantity of petrol into this cylinder.

Figure 2:
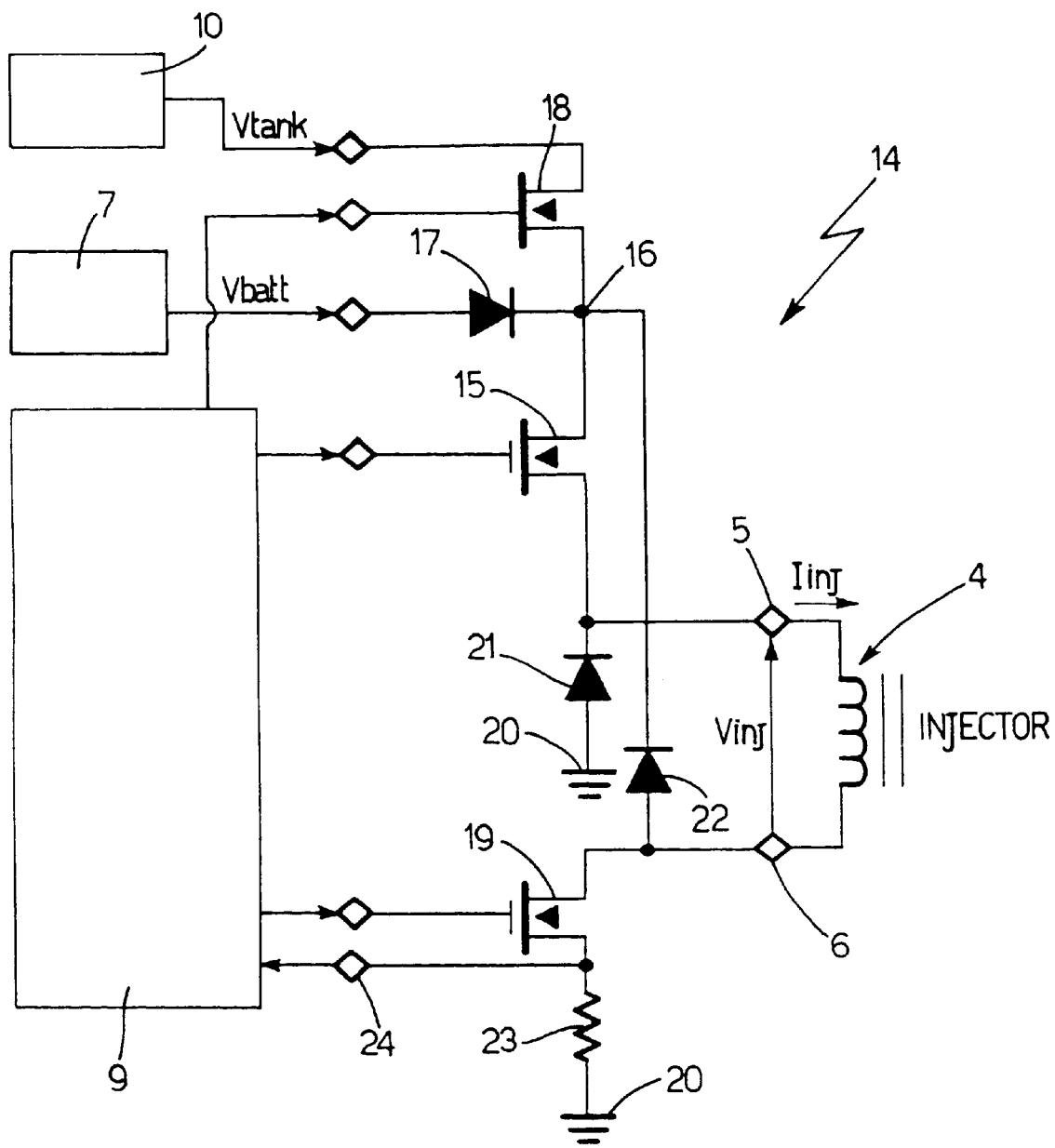
FIG. 2 is a diagrammatic view of an actuation circuit of the control device of FIG. 1.

As shown in FIG. 2, each injector 2 is current-driven and is provided with a control circuit 4 provided with a pair of terminals 5 and 6; in order to actuate an injector 2 it is necessary to cause an electric current of predetermined intensity to circulate through the respective control circuit 4. It has been observed in experimental tests that the control circuit 4 of each injector 2 comprises electrical components of inductive and of resistive type. The flow of petrol injected by each injector 2 during its opening phase is substantially constant and therefore the quantity of petrol injected by the injector 2 into the respective cylinder (not shown) is directly proportional to the opening time of this injector 2.

The control device 1 is supplied by a battery 7 of the engine 3 and comprises a control unit 8, which is provided with a control member 9, a converter 10 supplied by the battery 7, a safety member 11 and a power stage 12.

The control unit 9 dialogues with a control unit 13 (typically a microprocessor) of the engine 3 in order to receive the desired opening time value Tinj (directly proportional to the desired value of the quantity of petrol to be injected) and the injection start time from this control unit 13 for each injector 2 and for each engine cycle. On the basis of the data received from the control unit 13, the control member 9 controls the power stage 12 which actuates each injector 2 by causing a predetermined electric current Iinj (variable over time) to circulate through the respective control circuit 4 by applying a voltage Vinj (variable over time) to the heads of the corresponding terminals 5 and 6.

The power stage 12 receives the control signals from the control member 9 and is supplied both directly from the battery 7 with a voltage Vbatt nominally equal to 12 Volt, and from the converter 10 with a voltage Vtank nominally equal to 80 Volt. The converter 10 is a d.c.-d.c. converter of known type which is able to raise the voltage Vbatt of the battery 7 to the voltage Vtank of 80V.

The safety member 11 is able to dialogue with both the control member 9 and the power stage 12 so as to verify, using methods described below, the correct actuation of the injectors 2.

As shown in FIG. 2, the power stage 12 comprises, for each injector 2, a respective drive circuit 14 which is connected to the terminals 5 and 6 of the respective control circuit 4 and is controlled by the control member 9 in order to cause a predetermined electric current Iinj to circulate through this control circuit 4.

Each drive circuit 14 comprises a transistor 15 controlled by the control member 9 and adapted to connect the terminal 5 of the respective control circuit 4 to an intermediate terminal 16 which is connected to the voltage Vbatt of the battery 7 via a non-return diode 17 and is connected to the voltage Vtank of the converter 10 via a transistor 18 controlled by the control member 9. Each drive circuit 14 further comprises a transistor 19 controlled by the control member 9 and adapted to connect the terminal 6 of the respective control circuit 4 to a common earth 20, and two recirculation diodes 20 and 22 connected respectively between the terminal 5 and the earth 20 and between the terminal 6 and the intermediate terminal 16. According to a preferred embodiment shown in FIG. 2, the transistors 15, 18, 19 are of MOS type.

A shunt resistor 23 provided with a measurement terminal 24 is inserted between the transistor 19 and the earth 20; by measuring the voltage at the terminals of the resistor 23 (i.e. the voltage existing between the measurement terminal 24 and the earth 20) it is possible to measure the intensity of the current Iinj when the transistor 19 is conducting. According to a further embodiment (not shown), the shunt resistor 23 is connected directly to the terminal 6 in order continuously to measure the intensity of the current Iinj. According to a further embodiment (not shown), the shunt resistor 23 is connected upstream of the transistor 19 rather than downstream of the transistor 19 as shown in FIG. 2.

Figure 3:
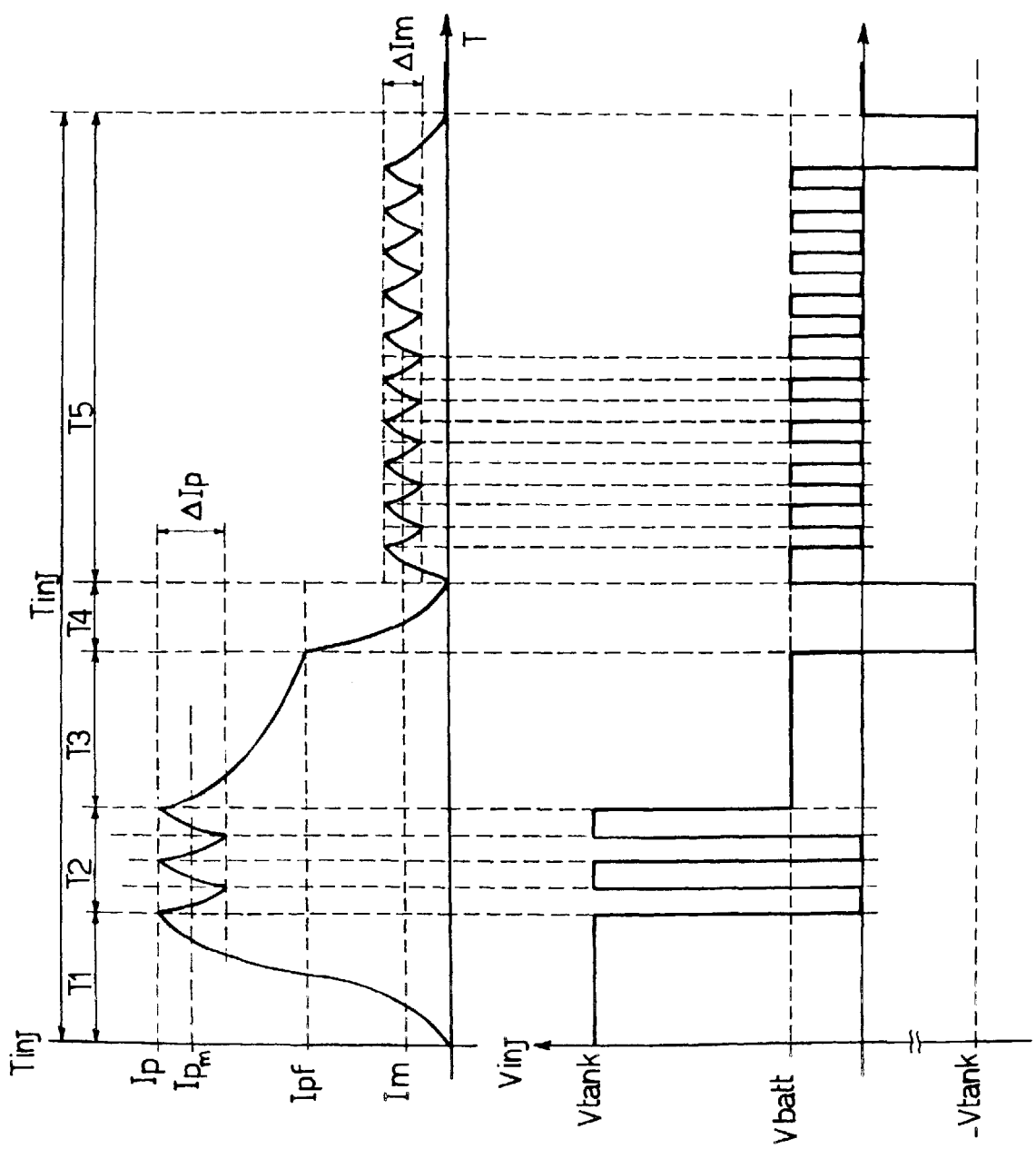
FIG. 3 shows the time curve of some electrical magnitudes characteristic of the circuit of FIG. 2.

As shown in FIGS. 2 and 3, an injection phase of an injector 2 is described below with particular reference to the time curve of the current Iinj circulating via the terminals 5 and 6 of the respective control circuit 4 and the time curve of the voltage Vinj at the heads of these terminals 5 and 6.

Initially, the transistors 15, 18 and 19 are all deactivated, the control circuit 4 is isolated, the current Iinj has a zero value and the injector is closed.

To start the injection phase, the transistors 15, 18 and 19 are simultaneously caused to conduct, then the terminal 5 is connected to the voltage Vtank via the transistors 15 and 18, the terminal 6 is connected to the earth 20 via the transistor 19 and the voltage Vinj is equal to Vtank. In these conditions, the current Iinj increases rapidly for a time T1 up to a peak value Ip and the injector 2 opens and starts to inject petrol.

When the current Iinj reaches the value Ip, a current control (which uses the measurement of the current Iinj performed using the resistor 23) maintains the current Iinj within an amplitude range $\Delta Ip$ centred on a mean value Ipm for a time T2 by acting on the control of the transistor 19 which switches cyclically between a conducting state and a deactivated state. During the conducting state of the transistor 19, the terminal S is connected to the voltage Vtank via the transistors 15 and 18; the terminal 6 is connected to the earth 20 via the transistor 19, the voltage Vinj is equal to Vtank and the value of Iinj increases; whereas during the deactivated state of the transistor 19, the recirculation diode 22 starts to conduct and short-circuits the terminals 5 and 6 via the transistor 15, the voltage Vinj is zero and the value of Iinj decreases. The intensity of the current Iinj is measured only when the transistor 19 is conducting, since the measurement resistor 23 is disposed upstream of the transistor 19; however, the time constant of the control circuit 4 is known and constant, and therefore the control member 9 is able to calculate when the current Iinj reaches the lower limit (Ipm$-\Delta Ip/2$) and the transistor 19 must be caused to conduct again.

After the current Iinj has remained substantially at the value Ip for the time T2, the control member 9 causes the transistors 15 and 19 to continue to conduct and deactivates the transistor 18, and therefore the terminal 5 is connected to the voltage Vbatt via the transistor 15 and the diode 17, the terminal 6 is connected to the earth 20 via the transistor 19 and the voltage Vinj is equal to Vbatt. In these circumstances, the current Iinj drops slowly for a predetermined time T3 to a value IpF; at this point the control member 9 simultaneously deactivates all three transistors 15, 18 and 19 and, as a result of the current Iinj that cannot be instantaneously cancelled out, the recirculation diode 21 and, in an inverse manner, the transistor 18 start to conduct, with the result that the terminal 5 is connected to the earth 20 via the recirculation diode 21, the terminal 6 is connected to the voltage Vtank via the recirculation diode 22 and the transistor 18, the voltage Vinj is equal to -Vtank and the current Iinj decreases rapidly.

It should be noted that the transistor 18 starts to conduct in an inverse manner as a result of the characteristics of the MOS junction, which has a parasitic diode disposed in parallel with this junction and adapted to be biased in an inverse manner with respect to the junction.

After a time T4 sufficient substantially to cancel out the current Iinj, the control member 9 brings to and maintains the current Iinj substantially at a value Im causing the transistor 15 to continue to conduct and acting on the control of the transistor 19 which switches cyclically between a conducting state and a deactivated state. In this situation, the transistor 19 is current-driven to maintain the current Iinj within an amplitude range $\Delta Im$ centred on Im for a time T5 according to the methods described above. At the end of the time T5, all the transistors 15, 18 and 19 are deactivated and the current Iinj rapidly returns to zero according to the methods described above.

Once the current Iinj returns to zero and remains at a zero value for a predetermined time, the injector 2 closes and stops injecting petrol. As clearly shown in FIG. 3, the sum of the times T1, T2, T3, T4, T5 is equal to the total injection time Tinj, i.e. to the total time during which the injector 2 remains open.

It will be appreciated from the above that during the injection phase, the control circuit 4 is traversed by a current wave which is variable over time and comprises an initial section (corresponding to the time intervals T1, T2 and T3) which is substantially of a pulse type and has a relatively high current intensity Iinj equal to the peak value Ip, an intermediate section (corresponding to the time interval T4) during which the current intensity Iinj is rapidly reduced to substantially zero values and a subsequent final section (corresponding to the time interval T5) which has a relatively low current intensity Iinj equal to a value Im.

The initial section of the current wave Iinj comprises a first part (corresponding to the time interval T1), in which the intensity of the current Iinj increases rapidly to the value Ip, a second part (corresponding to the time interval T2), in which the intensity of the current Iinj is maintained substantially constant and equal to the value Ip, and a third part (corresponding to the time interval T3) in which the intensity of the current Iinj progressively diminishes.

The initial section of pulse type is characterised by a rapid increase of the intensity of the current Iinj to high values and is necessary to ensure rapid opening of the injector 2; in order rapidly to open the injector 2 a high force (proportional to the square of the current intensity Iinj) is needed so that mechanical inertia and both static and dynamic friction can be rapidly overcome. Once open, the injector 2 needs a relatively low force to remain open and therefore during the final phase the current Iinj is maintained at the relatively low value Im.

During the intermediate phase, the current is cancelled out for an extremely short period which is not sufficient to allow the injector 2 to close again as a result of the system's mechanical inertia; the current Iinj needs to be cancelled out to discharge the energy accumulated during the initial phase in the inductances of the control circuit 4. In this way, even when the time T5 is extremely low, i.e. when the total injection time Tinj is small (typically during idling), the injector 2 closes again exactly at the end of the time T5 and does not remain open for a longer time as a result of the energy stored in the inductances during the initial phase.

It will be appreciated from the above that the current Iinj is maintained substantially constant (less a tolerance equal to $\Delta Ip/2$ and $\Delta Im/2$) during the time intervals T2 and T5 using a "chopper" technique, i.e. by applying a positive voltage (Vtank or Vbatt) and a zero voltage cyclically to the heads of the control circuit 4 (i.e. between the terminals 5 and 6). This control technique has major advantages as it makes it possible extremely accurately to maintain the desired current value (Ip or Im) and at the same time to reduce overall dissipation losses to a minimum.

It should be noted that the voltage Vbatt of the battery 7 is equal to 12V, while the voltage Vtank of the converter 10 has a nominal value preferably of between 60 and 90V; moreover, the actual value of the voltage Vtank of the converter 10 may decrease with respect to the initial nominal value during the driving of an injector 2 as a result of the load effect due to the respective control circuit 4.

Cyclically, the control unit 13 requests a verification of the actual injection times Tinjeff of the injectors 2 from the safety member 11, so as to check whether each injector 2 is injecting exactly (less a certain tolerance obviously) the quantity of petrol calculated by the control unit 13 on the basis of commands received from a driver and on the basis of the operating conditions of the engine 3 into the respective cylinder (not shown). This check is extremely important as in direct petrol injection engines the torque generated depends directly on the quantity of petrol injected (and therefore on the actual injection time Tinjeff) and an incorrect driving of the injectors 2 may cause the engine 3 to generate a drive torque which is much higher than the drive torque desired by the driver which would obviously be hazardous for the driver.

In order to conduct a check of compliance with the desired injection times Tinj, the control unit 13 sends a request to the safety member 11 together with the desired injection time values Tinj for each injector 2 in the subsequent engine cycle; the safety member then measures in sequence the actual injection times Tinjeff of all the injectors 2 and, once these measurements have been completed, compares each actual injection time value Tinjeff with the respective desired injection time value Tinj which has been calculated previously by the control unit 13.

Depending on the result of the comparison between each actual injection time value Tinjeff and the respective desired injection time value Tinj, the control member 11 decides whether or not to generate an error signal. According to a preferred embodiment, the error signal is generated if, for one injector 2 at least, the difference between the desired injection time value Tinj and the actual injection time value Tinjeff is outside a predetermined acceptability range. According to a further embodiment, the error signal is generated on the basis of a combination of the results of the comparisons between the actual injection time values Tinjeff and the desired injection time values Tinj of all the injectors 2.

According to a preferred embodiment, the actual injection time Tinjeff of an injector 2 is calculated both by detecting the intensity of the current Iinj passing through the respective control circuit 4 and by detecting the control signal of the respective transistor 15 (as the main transistor of the relative drive circuit 14). According to a further embodiment, the actual injection time Tinjeff of an injector 2 is calculated either by detecting the intensity of the current Iinj passing through the respective control circuit 4 or by detecting the control signal of the respective transistor 15. According to a further embodiment, the actual injection time Tinjeff of an injector 2 is calculated both by detecting the intensity of the current Iinj passing through the respective control circuit 4 and by detecting the control signal of all the transistors 15, 18 and 19 of the relative drive circuit 14.

Figure 4:
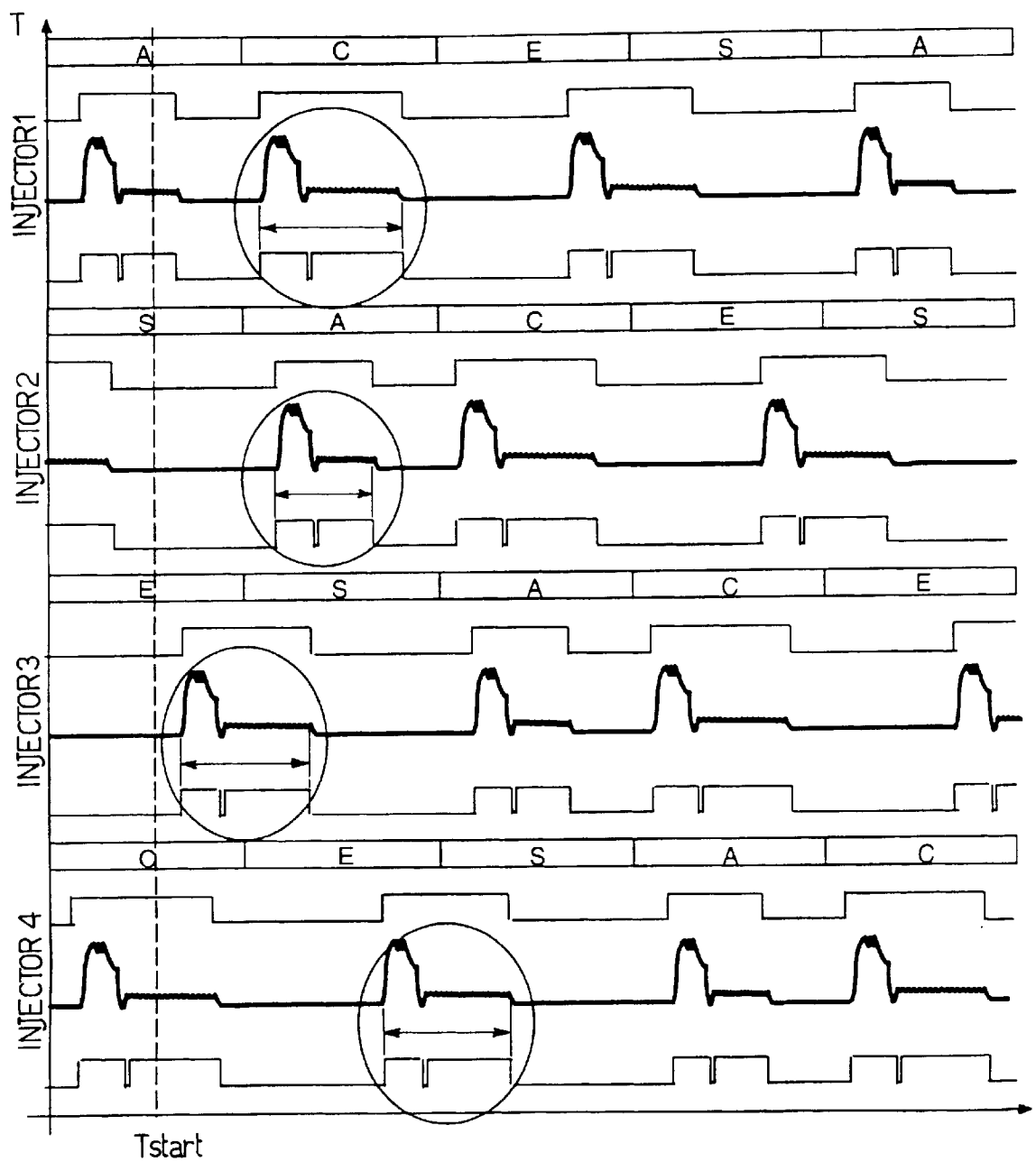
FIG. 4 shows the time curve of some electrical magnitudes characteristic of the device of FIG. 1.

FIG. 4 shows, for each injector 2, an example of the wave shape of the intensity of the current Iinj and of the control signal of the respective transistor 15 during a control cycle performed by the safety member 11. At the moment Tstart, the control unit 13 sends the request to perform a control cycle to the safety member 11; at this point, the safety member 11 disregards the injection pulses already under way (INJECTOR1 and INJECTOR4) and measures the actual injection time Tinjeff for each injector 2 during the subsequent injection pulses.

What is claimed is:

1. A method for the control of a group of injectors (2) in an internal combustion engine (3), in which method a relevant desired value (Tinj) of the opening time of each injector (2) is calculated for a given engine cycle (3) and this desired value (Tinj) is forwarded to a drive device (12) of the injector (2);

a relevant actual value (Tinjeff) of the opening time of each injector (2) is calculated during the injection phase, each actual value (Tinjeff) is compared with the relevant desired value (Tinj) once the actual values (Tinjeff) of all the injectors (2) have been calculated, and an error signal is possibly generated on the basis of a combination of the results of the comparisons between the actual values (Tinjeff) and the desired values (Tinj) of all the injectors (2).

2. A method as claimed in claim 1, in which the actual value (Tinjeff) of the opening time of each injector (2) is calculated by detecting the value of the current (Iinj) passing through a control circuit (4) of the injector (2) at least during some instants of the injection phase.

3. A method as claimed in claim 1, in which the actual value (Tinjeff) of the opening time of each injector (2) is calculated by detecting a control signal of a main transistor (15) of the drive device (12).

4. A method as claimed in claim 1, in which the actual value (Tinjeff) of the opening time of each injector (2) is calculated both by detecting the value of the current (Iinj) passing through a control circuit (4) of the injector (2) and by detecting a control signal of a main transistor (15) of the drive device (12).

5. A method as claimed in claim 1, in which the comparison between the actual values (Tinjeff) and the desired values (Tinj) is carried out only during predetermined cycles of the engine (3).

* * * * *